United States Patent
Oyagi et al.

(10) Patent No.: US 7,209,729 B2
(45) Date of Patent: Apr. 24, 2007

(54) CRADLE, SECURITY SYSTEM, TELEPHONE, AND MONITORING METHOD

(75) Inventors: Masayuki Oyagi, Kyoto (JP); Tanichi Ando, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 205 days.

(21) Appl. No.: 10/473,615

(22) PCT Filed: Apr. 2, 2002

(86) PCT No.: PCT/JP02/03303

§ 371 (c)(1),
(2), (4) Date: Oct. 1, 2003

(87) PCT Pub. No.: WO02/082795

PCT Pub. Date: Oct. 17, 2002

(65) Prior Publication Data

US 2004/0110544 A1    Jun. 10, 2004

(30) Foreign Application Priority Data

Apr. 3, 2001    (JP) .............................. 2001-105211

(51) Int. Cl.
*H04M 11/04*    (2006.01)

(52) U.S. Cl. ................ 455/404.1; 455/404.2; 455/410; 455/456.1; 455/550.1; 455/554.1; 455/556.1; 455/557; 340/506; 379/39; 379/40; 348/152

(58) Field of Classification Search ................ 455/403, 455/404.2, 414.1, 410, 454, 456.1, 550.1, 455/554.1, 556.1, 557, 404.1; 340/506; 379/39–40; 348/152–155
See application file for complete search history.

(56) References Cited

U.S. PATENT DOCUMENTS

| | | | | |
|---|---|---|---|---|
| 6,049,273 A | * | 4/2000 | Hess | 340/539.11 |
| 6,049,353 A | * | 4/2000 | Gray | 348/159 |
| 6,060,994 A | * | 5/2000 | Chen | 340/521 |
| 6,073,004 A | | 6/2000 | Balachandran | |
| 4,716,582 A | * | 12/1987 | Blanchard et al. | 379/28 |
| 4,868,859 A | * | 9/1989 | Sheffer | 379/39 |
| 5,103,474 A | * | 4/1992 | Stoodley et al. | 455/403 |
| 5,134,644 A | * | 7/1992 | Garton et al. | 379/39 |
| D345,712 S | * | 4/1994 | Rounds | D10/106 |
| 5,309,506 A | * | 5/1994 | Alexander | 379/93.02 |
| 5,454,024 A | * | 9/1995 | Lebowitz | 379/40 |
| 5,568,535 A | * | 10/1996 | Sheffer et al. | 379/39 |
| 5,745,849 A | | 4/1998 | Britton | |
| 5,873,039 A | * | 2/1999 | Najafi | 455/454 |
| 5,929,752 A | * | 7/1999 | Janky et al. | 340/426.2 |
| 5,933,774 A | * | 8/1999 | Bertocci | 455/417 |
| 5,953,650 A | * | 9/1999 | Villevieille | 455/404.2 |
| 5,977,871 A | * | 11/1999 | Miller et al. | 340/506 |
| 5,978,684 A | * | 11/1999 | Cook et al. | 455/462 |

(Continued)

FOREIGN PATENT DOCUMENTS

EP    0 936 794 A2    8/1999

(Continued)

*Primary Examiner*—Steve M. D'Agosta
(74) *Attorney, Agent, or Firm*—Foley & Lardner LLP

(57) ABSTRACT

A cradle includes: a telephone supporting section supporting a mobile telephone; a connecting section electrically connecting to the mobile telephone; a sensor communications section receiving a report from a sensor sensing a state of a monitored area; and a transmission instructing section providing an instruction signal to the mobile telephone via the connecting section to cause the mobile telephone to transmit a content of the report from the sensor to a management center.

28 Claims, 11 Drawing Sheets

U.S. PATENT DOCUMENTS

| | | | |
|---|---|---|---|
| 6,091,771 A * | 7/2000 | Seeley et al. | 375/240 |
| 6,215,404 B1 * | 4/2001 | Morales | 340/577 |
| 6,263,050 B1 * | 7/2001 | Akhteruzzaman et al. | 379/45 |
| 6,452,490 B1 * | 9/2002 | Garland et al. | 340/506 |
| 2002/0090961 A1 * | 7/2002 | Walley et al. | 455/462 |

FOREIGN PATENT DOCUMENTS

| | | |
|---|---|---|
| JP | 61-21162 U | 2/1986 |
| JP | 63-24395 A | 2/1988 |
| JP | 63-502228 A | 8/1988 |
| JP | 2-93862 | 7/1990 |
| JP | 04-280560 A | 10/1992 |
| JP | 10-126839 | 5/1998 |
| JP | 11-284986 A | 10/1999 |
| JP | 2000-505970 A | 5/2000 |
| JP | 2000-332820 A | 11/2000 |
| JP | 11-210608 * | 2/2001 |
| JP | 2001-057600 A | 2/2001 |
| JP | 2001-069268 A | 3/2001 |
| JP | 2001-076273 A | 3/2001 |
| JP | 3076499 U | 4/2001 |
| WO | WO 99/23809 A1 | 5/1999 |
| WO | WO 00/29998 | 5/2000 |
| WO | WO 01/22701 A1 | 3/2001 |

* cited by examiner

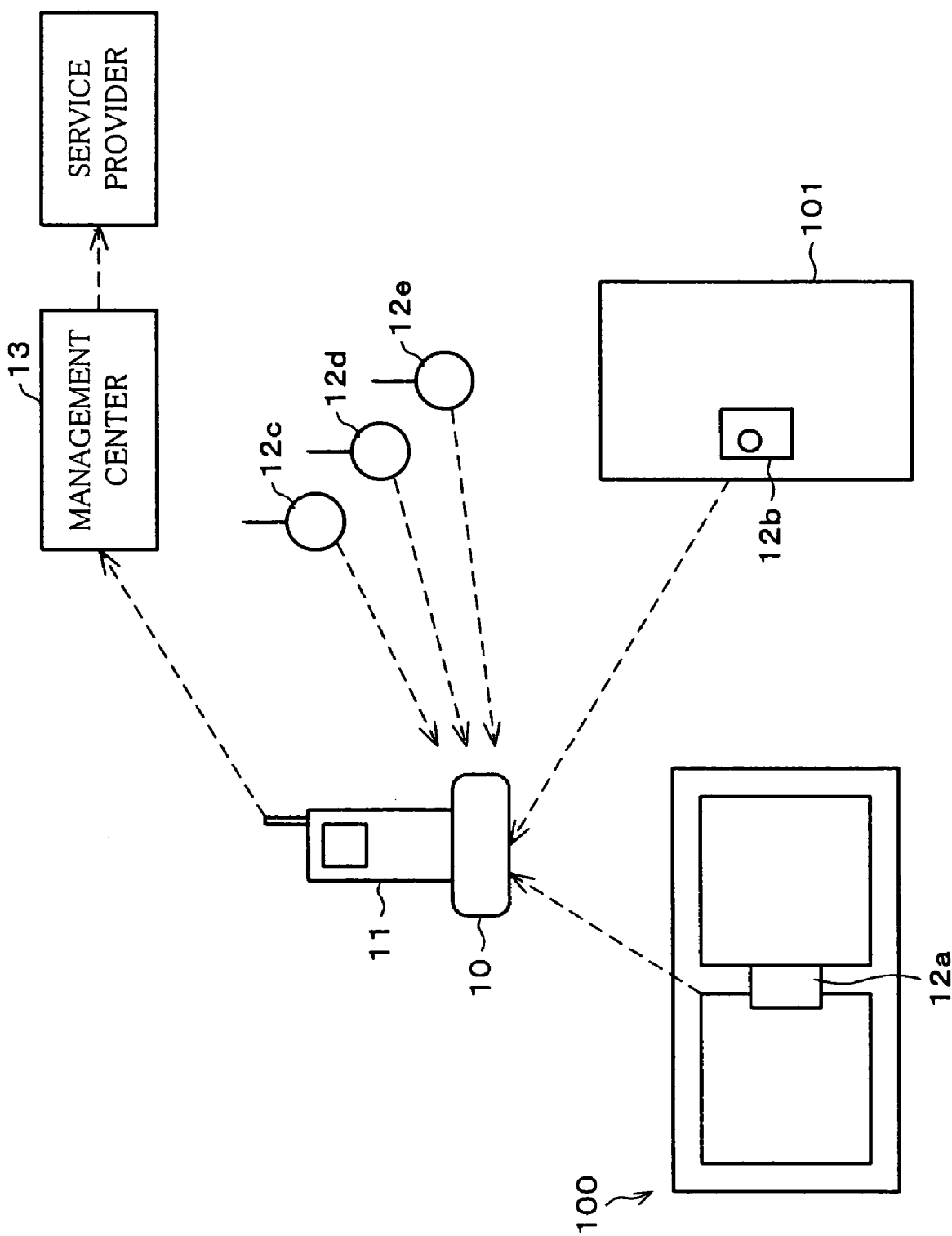

CRADLE, SECURITY SYSTEM, TELEPHONE, AND MONITORING METHOD

TECHNICAL FIELD

The present invention relates to a telephone cradle which externally transmits report contents from various sensors through a mobile or other telephone; a security system consisting of such a cradle and a managing device; a telephone; and a monitoring method.

BACKGROUND ART

Mobile telephones have dramatically improved their capability as they quickly move into widespread use. Many new models are being introduced to the market, equipped with a variety of new functions on top of inherent voice communications function: for example, a communications function to connect to a communications network such as the Internet, an imaging function for a camera; and a positioning function to obtain current position and related map information.

The mobile telephone is usually mounted to a support called a cradle for storage purposes when it is not in use, for example, when the user is at home. Apart from providing safe storage for the mobile telephone, the function of the conventional mobile telephone cradle is limited to charging the mobile telephone.

In this manner, the conventional cradle only keeps the mobile telephone in good working order and never actively makes full use of the functions of the mobile telephone. PDA (Personal Digital Assistant) cradles are known to act to transfer stored data from a PDA to a personal computer or other external device. As mentioned previously, recent mobile telephones are equipped with better functions even in comparison to PDAs, but no cradle is proposed to exploit them.

For example, the communications and imaging functions are indispensable in various security and home control systems. If the system is capable of effectively making use of the functions of the mobile telephone, the system is made simple and inexpensive and becomes equipped with a capability to provide sophisticated, information-related collaboration service.

The present invention is conceived to address these issues and has an objective to provide a simple, but highly capable cradle which only requires the user to replace a mobile or other telephone on it; a security system including the cradle and a managing device; a telephone; and a monitoring method.

DISCLOSURE OF INVENTION

To solve the problems, a cradle according to the present invention is characterized in that it includes:

a telephone supporting section for supporting a telephone;

a connecting section for electrically connecting to the telephone;

a sensor communications section for receiving a report from a sensor sensing a state of a monitored area; and a transmission instructing section for providing an instruction signal to the telephone via the connecting section to cause to externally transmit a content of the report from the sensor; and a communications circuit for wirelessly communicating with the telephone.

In the arrangement, the sensor sensing a state of a monitored area may refer to any given sensor including open/close sensors, fire sensors, various built-in sensors, infrared sensors, and CCD cameras.

Note that the open/close sensor is installed at various doors and windows including the main entrance for the purpose of sensing an intruder into a house. The fire sensor senses a smoking and unusual rise in temperature for the purpose of sensing a fire. The various built-in sensors are incorporated in lights, safes, air conditioners, refrigerators, and the like for the purpose of detecting a person in the house and an abnormality of various indoor facilities. Especially suitable for the present invention among the infrared sensors and the CCD cameras are those attached to a robot watchdog or house animal for the purpose of detecting a suspicious person hanging around a house.

According to the arrangement, as the telephone is replaced on the telephone supporting section, the connecting section provides an electrical connection between the cradle and the telephone. In addition, the cradle receives a report from the sensor sensing a state of the monitored area via the sensor communications section, and the transmission instructing section provides an instruction signal to the telephone via the connecting section to cause the telephone to externally transmit the report content.

In addition, the user can input various information and setting instructions to the cradle by using the operation section on the telephone as a user interface. The user can also enjoy various functions of the telephone, including a Internet connecting function and imaging function.

Thus, a wide range of functions, including Internet connection and security services, are realized using a cradle, providing a safe deposition for a telephone, which has a simple arrangement with no long distance communications means or user interface included.

In addition, according to the arrangement, the cradle includes a communications circuit for wireless communications with the telephone. Therefore, the cradle can perform wireless communications with a telephone located nearby even when the mobile telephone is not replaced on the cradle.

Additional objects, advantages and novel features of the invention will be set forth in part in the description which follows, and in part will become apparent to those skilled in the art upon examination of the following or may be learned by practice of the invention.

BRIEF DESCRIPTION OF DRAWINGS

FIG. 11 is a schematic illustrating an example of operation of a security system.

BEST MODE FOR CARRYING OUT THE INVENTION

The following will describe an embodiment according to the present invention with reference to figures, which is by no means intended to limit the present invention.

[1. System Configuration]

Figure 1:
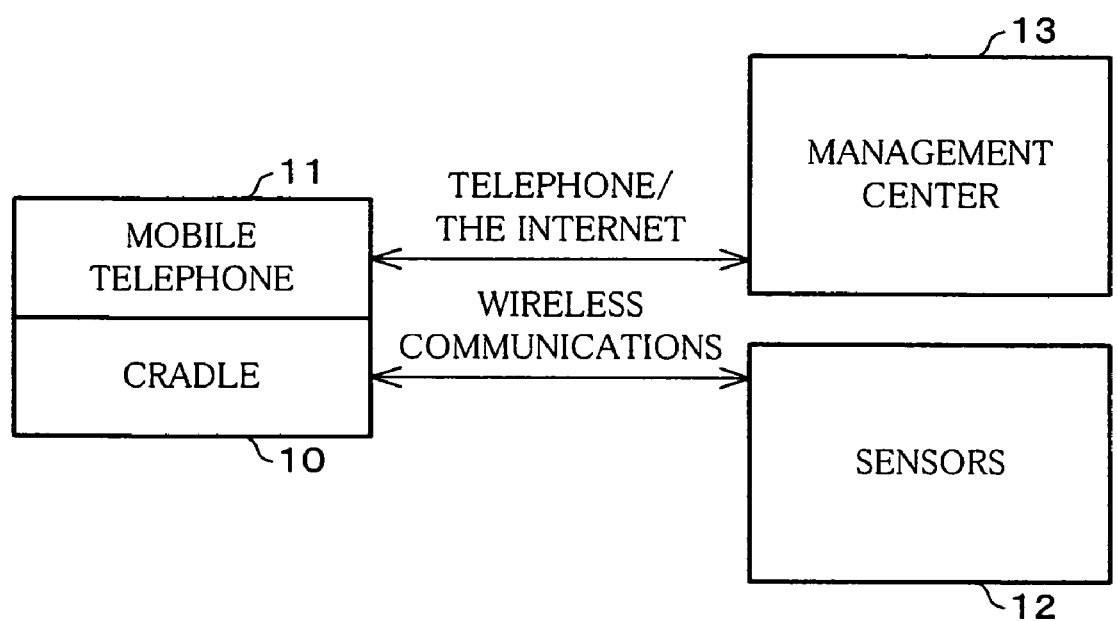
FIG. 1 is a block diagram schematically showing an arrangement of a security system according to an embodiment of the present invention.

FIG. 1 is a block diagram schematically showing an arrangement of the security system. As illustrated in the figure, the security system include a cradle 10 connected to a mobile telephone (telephone) 11; a management center (managing device) 13 which receives and manages information provided by the mobile telephone 11; and a sensor 12 which senses a state of a monitored area. The mobile telephone 11 and the management center 13 are linked to each other via a telephone communications network or the Internet. The cradle 10 and the sensor 12 are connected by short distance wireless communications (detailed later).

[2. Cradle and Mobile Telephone Structure]

Figure 2:
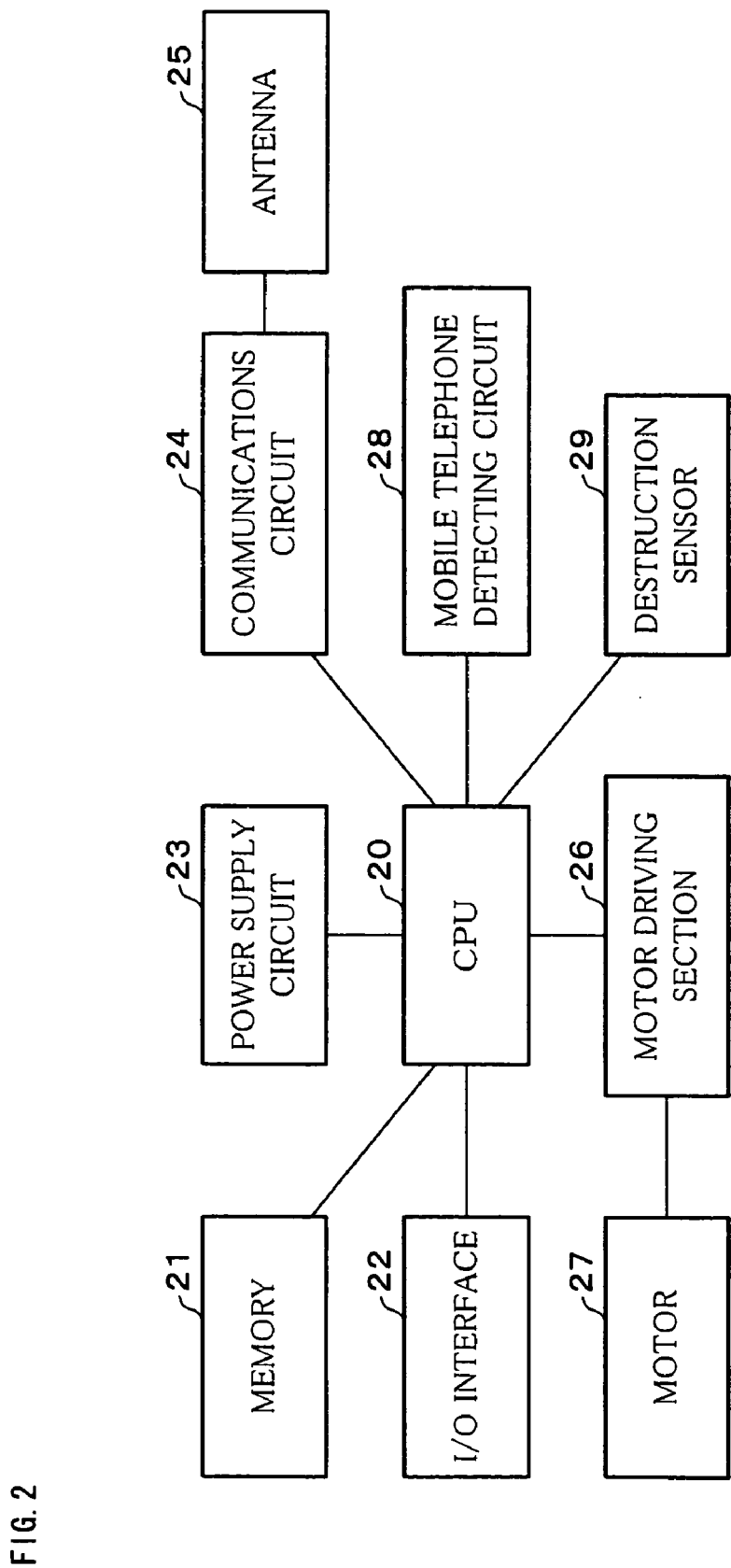
FIG. 2 is a block diagram schematically showing an arrangement of a cradle.

FIG. 2 is a block diagram schematically showing an arrangement of the cradle 10. As shown in the figure, the cradle 10 includes a CPU (control processing unit; transmission instructing section, sensor instructing section) 20, a memory (detected information storage section) 21, an I/O (Input/Output) interface 22, a power supply circuit 23, a communications circuit (sensor communications section) 24, an antenna (sensor communications section) 25, a motor driving section (orientation altering means) 26, a motor (orientation altering means) 27, a mobile telephone detecting circuit 28, and a destruction sensor (destruction sensing section) 29. In the arrangement, the memory 21, I/O interface 22, power supply circuit 23, communications circuit 24, motor driving section 26, mobile telephone detecting circuit 28, and destruction sensor 29 are connected to the CPU 20 via respective buses. In addition, the cradle 10 is housed in a housing made of molded resin or other material.

Built around, for example, a microcomputer, the CPU 20 collects and processes information and gives instructions to various control circuits based on its computing function. Hence, the CPU 20 controls the entire cradle 10.

The memory 21 is made up of a semiconductor memory such as a RAM (Random Access Memory) or a ROM (Read Only Memory); or an information storage device containing a recording medium such as a magnetic disk drive or an optical disc drive. The memory 21 stores various information under the control of the CPU 20. The memory 21 stores programs and data so that they are available for the CPU 20 to implement various kinds of control and computation.

The I/O interface 22 is an interface circuit for data exchange with external devices under the control of the CPU 20. The I/O interface 22 is provided with various interface circuits and a connection connector to communicate with the mobile telephone 11.

The power supply circuit 23 supplies electric power to the whole cradle 10 including the CPU 20, etc. and is made up of various transformer, stabilizer, and other circuits. In addition, the power supply circuit 23 has a charging function whereby the mobile telephone 11 is charged through the connector (detailed later).

The communications circuit 24 and the antenna 25 are provided to enable the cradle 10 to perform short distance wireless communications (wireless communications) with, for example, the sensor 12. The communications circuit 24 and the antenna 25 operate by means of a weak radio wave over a 2.4-GHz (gigahertz), 11-Mbps LAN (Local Area Network) or Bluetooth™ standards whereby under normal conditions, communications are possible over a distance of about tens to hundreds of meters indoors.

The motor driving section 26 and the motor 27 constitute drive means for changing the orientation of a camera mounted to a housing 30 for the mobile telephone 11 or the cradle 10 in accordance with a report content from the sensor 12 (detailed later). The motor driving section 26 is a circuit controlling the motor 27 under the control of the CPU 20.

The mobile telephone detecting circuit 28 acts to detect the mobile telephone 11 replaced on the cradle 10, and includes circuitry receiving a detection signal from a detecting section 63 (detailed later). Only when the mobile telephone detecting circuit 28 detects the mobile telephone 11 being replaced, does the CPU 20 transmit/receive various signals and supply electric power through the I/O interface 22.

The destruction sensor 29 includes a vibration sensor or a sound sensor to sense an assault or destructive act of an intruder on the cradle 10 through sensing of an abnormal vibration or sound.

Figure 3:
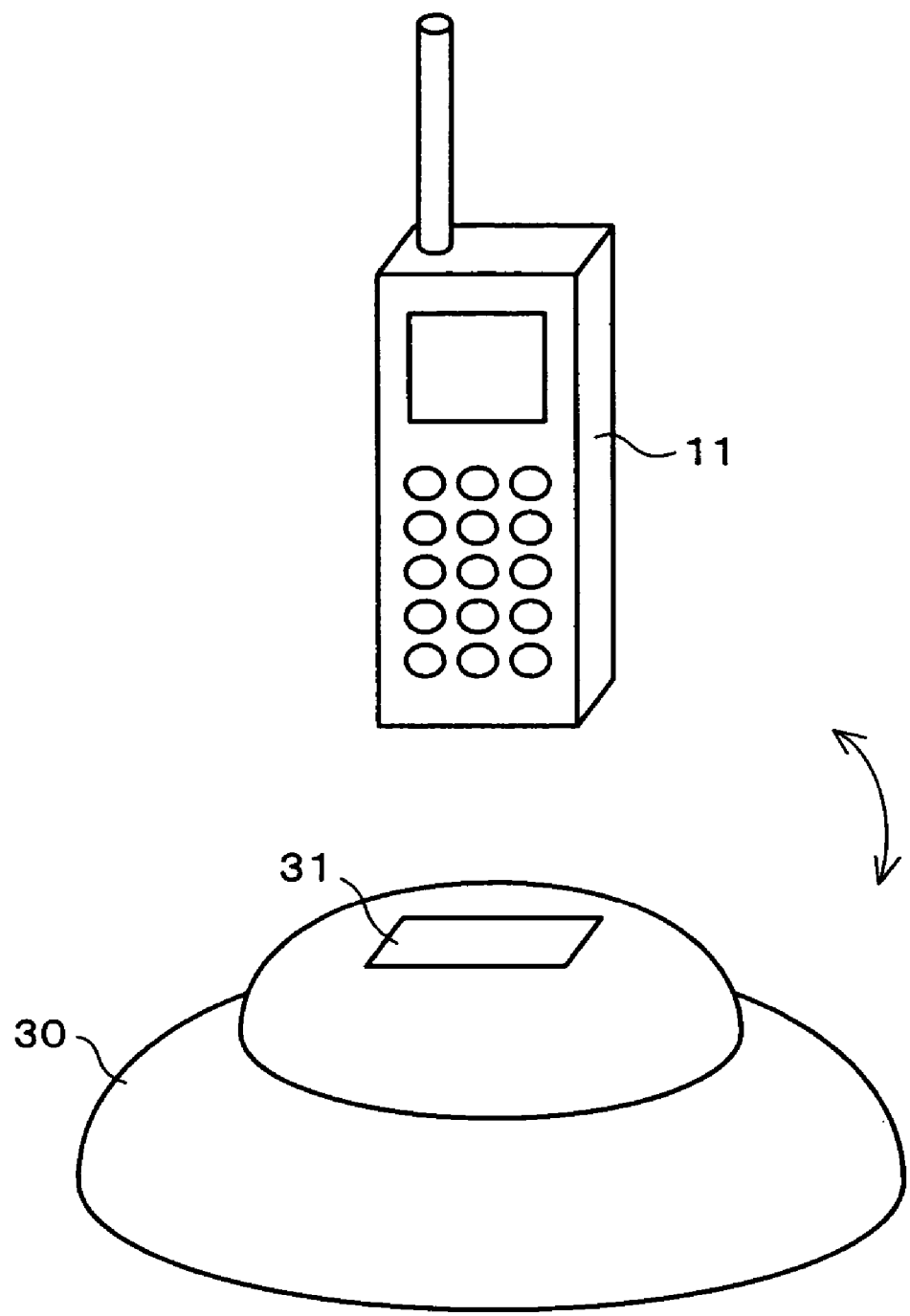
FIG. 3 is a perspective view showing an example of the appearance of a cradle housing.

FIG. 3 is a perspective view showing an example of the exterior of the housing for the cradle 10. As illustrated in the figure, the housing 30 has a hollow (telephone supporting. section) 31 to support the mobile telephone 11. On the bottom of the hollow 31 is there a connector (connecting section, data retrieval section; not shown) providing electrical connection to the mobile telephone 11. The connector is connected to the CPU 20 via the I/O interface 22 of the cradle 10. The connector is also responsible for transferring electric power from the power supply circuit 23 in the cradle 10 to the mobile telephone 11. The housing 30 can freely rotate in the horizontal direction as indicated by an arrow in the figure, by means of the motor driving section 26 and the motor 27 in the cradle 10.

Figure 4:
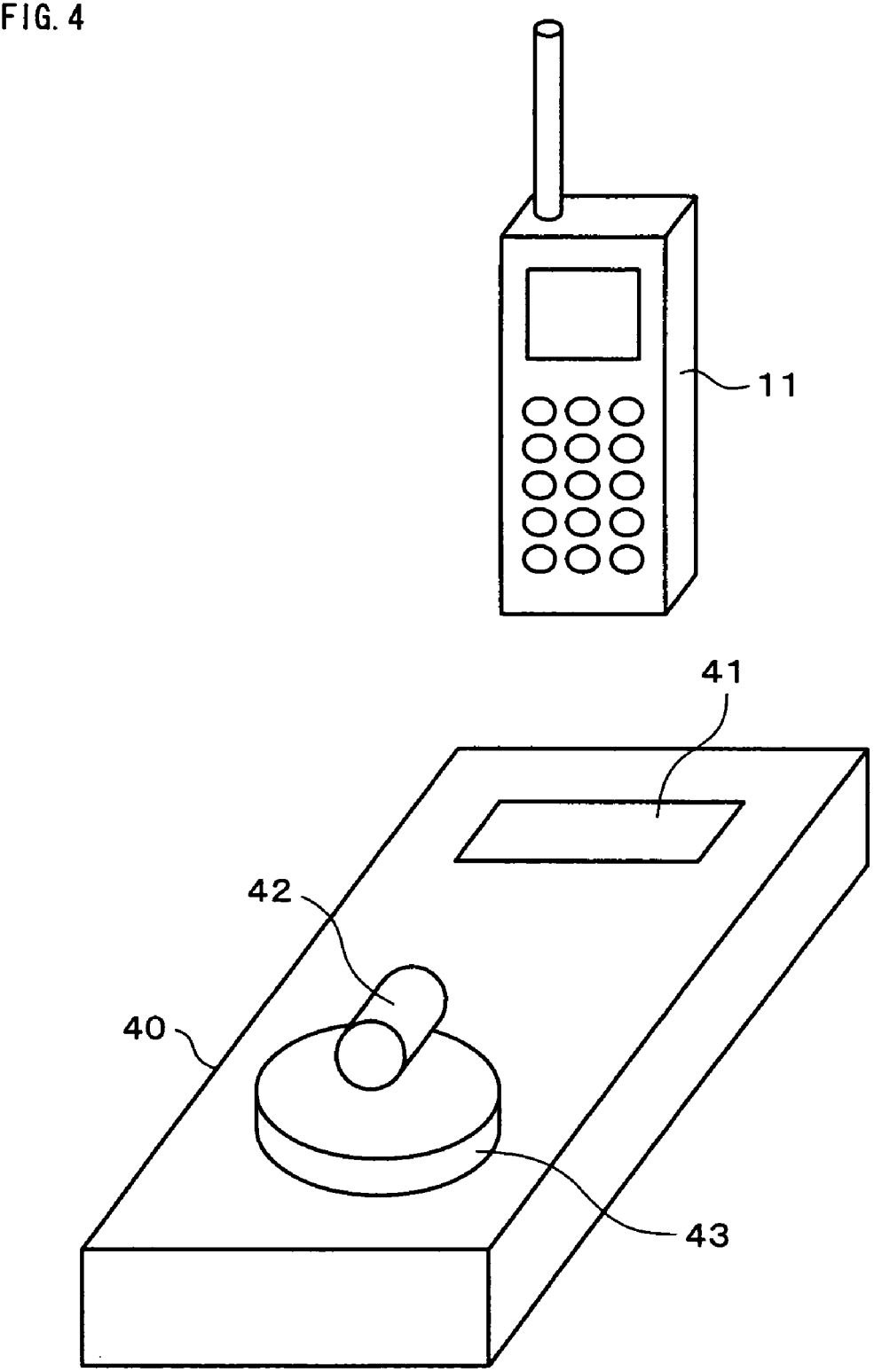
FIG. 4 is a perspective view showing another example of the appearance of a cradle housing.

FIG. 4 is a perspective view showing another example of the exterior of the housing for the cradle 10. The housing 40 in the figure has a camera section (imaging section) 42 and a rotational base 43 for the section 42, as well as a hollow 41 supporting the mobile telephone 11.

The rotational base 43 can freely rotate in the horizontal direction by means of the motor driving section 26 and the motor 27 in the cradle 10, capable of changing the image capture direction for the camera section 42 by 360 degrees. The camera section 42 has an optical zoom function of which the zoom ratio controlled by the CPU 20 in the cradle 10.

The CPU 20 can perform "digital zoom" on an image captured by the camera section 42 as part of image processing. On the bottom of the hollow 41 is there a connector (not shown) providing electrical connection to the mobile telephone 11. Image data captured by the camera section 42 is sent to the mobile telephone 11 via the connector.

Figure 5:
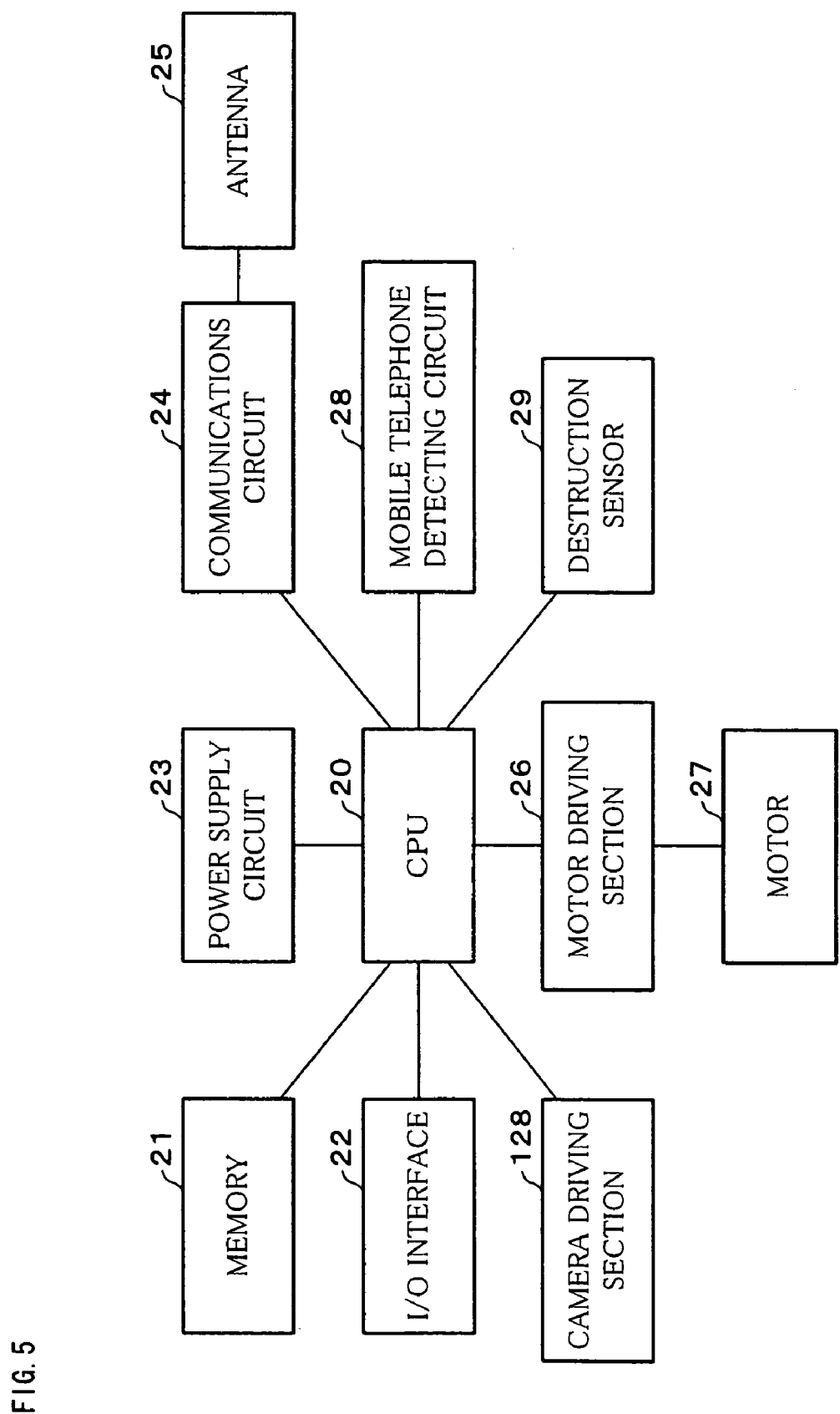
FIG. 5 is a block diagram showing an internal arrangement of the FIG. 4 housing.

FIG. 5 is a block diagram showing an internal arrangement of the housing 40. The figure uses the same reference numerals for common members as FIG. 2 and omits descriptions thereof. The camera driving section 128 in FIG. 5 is a circuit driving the camera section 42 under the control of the CPU 20. For example, the camera driving section 128 instructs the camera section 42 on shoot timings, shot counts, resolution, and zoom settings and supplies drive power to the camera section 42. In addition, the motor 27 is connected to the rotational base 43, and the CPU 20 rotates the rotational base 43 to control the image capture direction of the camera section 42.

Figure 6:
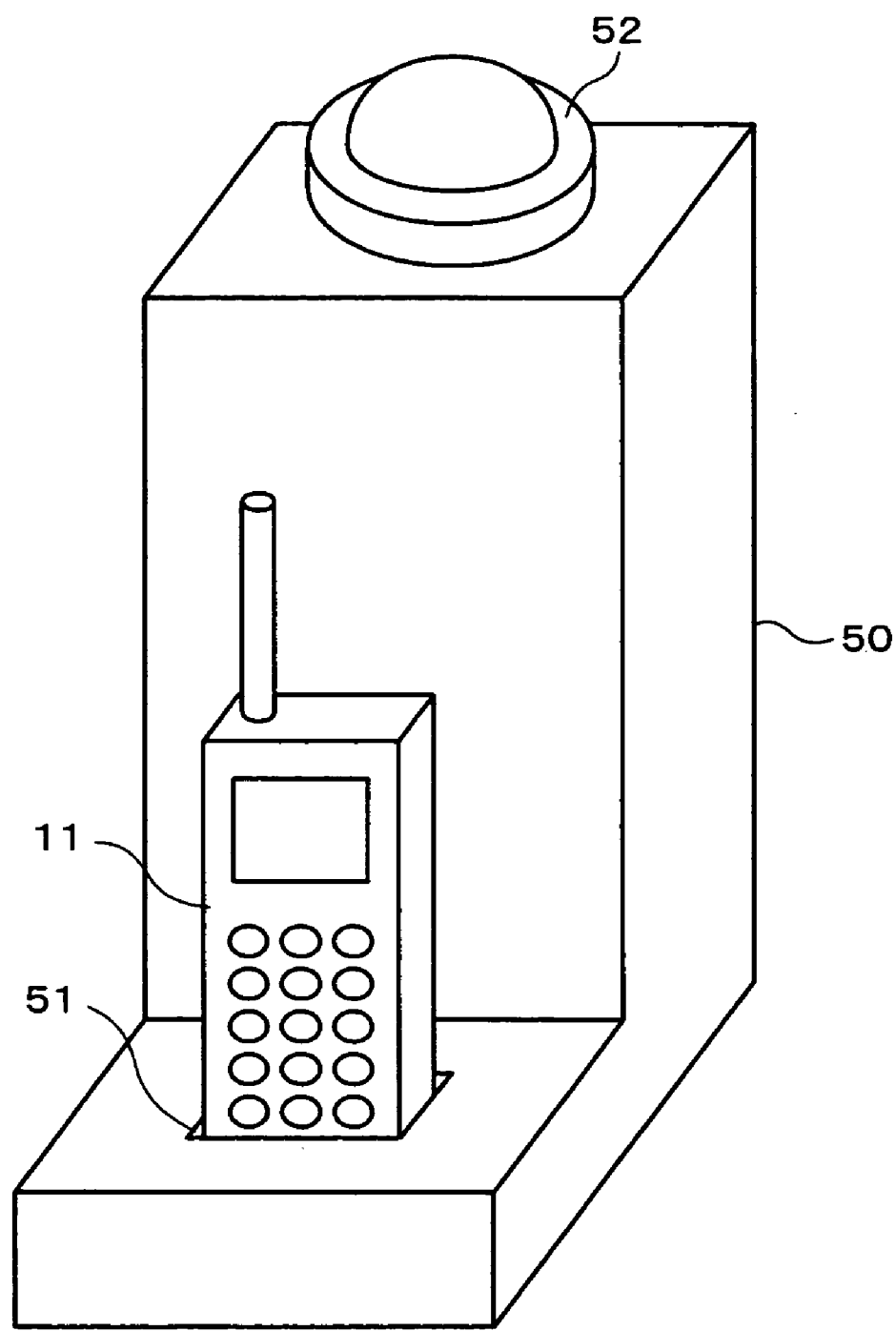
FIG. 6 is a perspective view showing yet another example of the appearance of a cradle housing.

FIG. 6 is a perspective view showing yet another example of the exterior of the housing for the cradle 10. The housing 50 in the figure has a camera section 52 provided integrally with a fish-eye lens to achieve a 360-degre view in imaging, as well as a hollow 51 supporting the mobile telephone 11.

The camera section 52 has also a correction circuit which corrects distortion of a captured image caused by the fish-eye lens by means of software. The housing in FIG. 6 shares following common features with the one in FIG. 4: the camera section 52 has various zoom functions, the bottom of the hollow 51 has a connector (not shown) to provide electrical connection to the mobile telephone 11, and image data captured by the camera section 52 is sent to the mobile telephone 11 via the connector.

Figure 7:
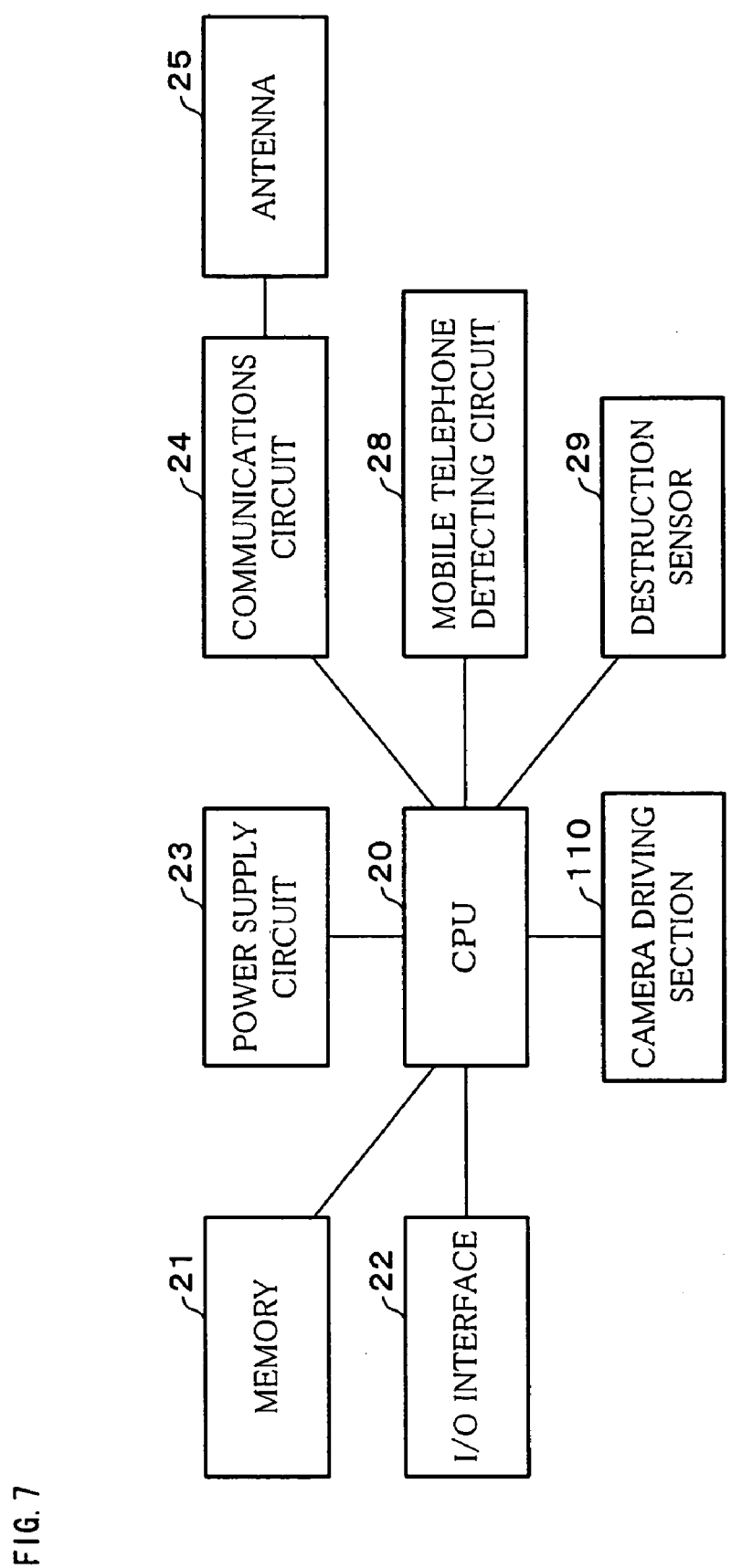
FIG. 7 is a block diagram showing an internal arrangement of the FIG. 6 housing.

FIG. 7 is a block diagram showing an internal arrangement of the housing 50. The figure uses the same reference numerals for common members as FIGS. 2 and 5 and omits descriptions thereof. The camera driving section 110 in FIG. 7 is a circuit driving the camera section 52 under the control of the CPU 20. For example, the camera driving section 110 instructs the camera section 52 on shoot timings, shot counts, resolution, and zoom settings and supplies drive power to the camera section 52. Also, the camera driving section 110 instructs the correction circuit in the camera section 52 on a correction process.

Figure 8:
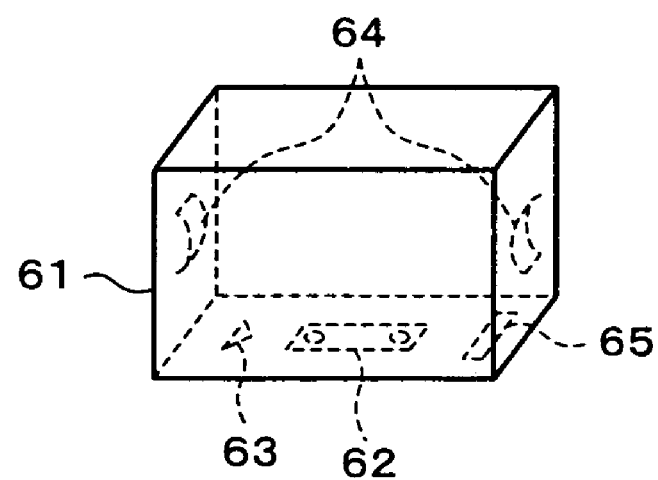
FIG. 8 is a perspective view showing a structure of connectors on a cradle housing.
Figure 8:
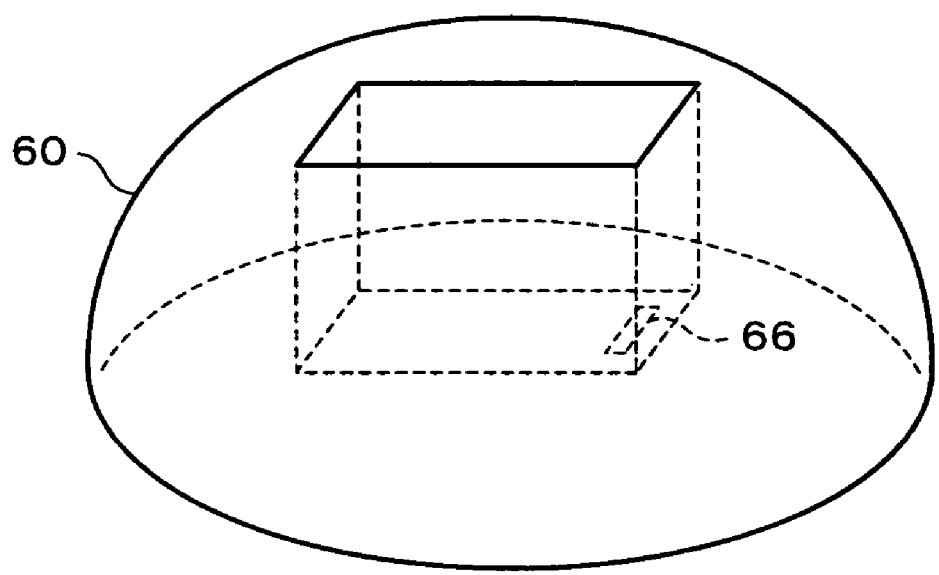

FIG. 8 is a perspective view showing a structure of connectors on a cradle housing. Referring to the figure, the hollow 61 has on the bottom a connector 62 shaped to couple with a connector on the mobile telephone 11: the connector 62 couples with a connector on the mobile telephone 11 to transmit/receive various data and supply electric power while maintaining electrical connection.

In addition to the connector 62, the hollow 61 has: a detecting section 63 detecting the replaced mobile telephone 11 through a key-shaped protrusion being pressed down; and a pair of press springs 64 firmly holding the mobile telephone 11. When the mobile telephone 11 is replaced in the hollow 61, the press springs 64 hold the mobile telephone 11 and the detecting section 63 detects the mobile telephone 11. A result of the detection by the detecting section 63 is sent to the mobile telephone detecting circuit 28 in the cradle 10, triggering signal transmission/reception and electric power supply between the cradle 10 and the mobile telephone 11 through the connector 62.

FIG. 8 shows a structure where the housing 60 and the hollow 61 are separable. Hollow connectors 65, 66 are therefore provided to the housing 60 and the hollow 61 respectively, to ensure electrical connection between the two members.

The connector 62 is not necessarily located on the bottom of the hollow 61: it may be located on a tip of a cable drawn out of the cradle 10. The arrangement allows the mobile telephone 11 to be placed beside to the housing. 20 The housing of the cradle 10 is not necessarily formed as in FIGS. 3–8; it may take any shape, including those resembling an animal's or robot's hand, so that it suits design requirements and user tastes. For example, the housing may send an animal sound or move the robot hand when the mobile telephone 11 is replaced on the cradle 10, which would attract the user's interest.

Figure 9:
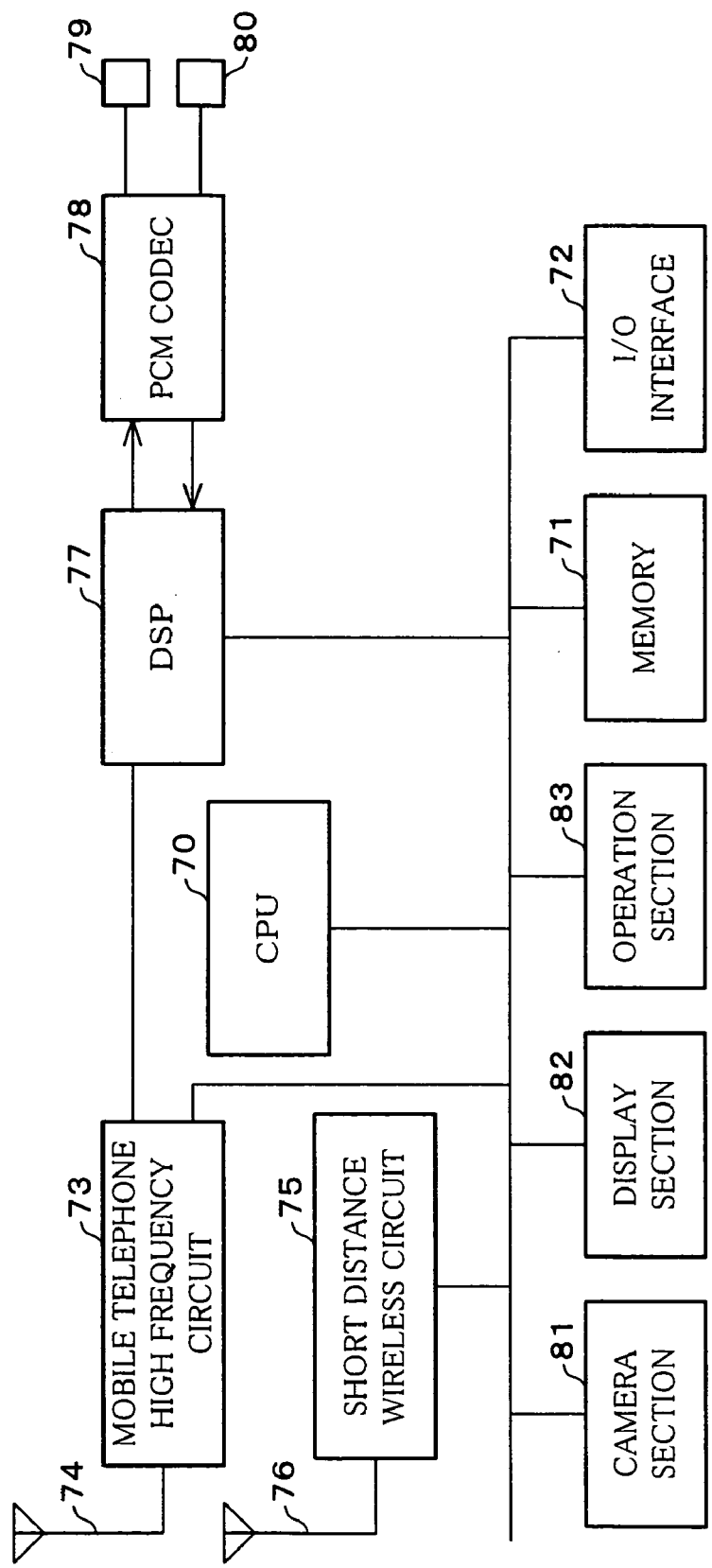
FIG. 9 is a block diagram schematically showing an arrangement of a telephone.

FIG. 9 is a block diagram schematically showing an arrangement of a telephone. As illustrated in the figure, the mobile telephone 11 includes a CPU 70, a memory 71, an I/O interface 72, a mobile telephone high frequency circuit 73, a mobile telephone high frequency antenna 74, a short distance wireless circuit (cradle communications section) 75, a short distance wireless communications antenna 76, a DSP 77, a PCM codec 78, a speaker 79, a microphone 80, a camera section 81, a display section 82, and an operation section 83. These components are connected by buses with each other except the antenna and the user interface. In the present embodiment, the mobile telephone 11 is not only capable of a voice communications function, but also provides imaging, Internet connection, positioning, and music playback, and other many functions.

Built around, for example, a microcomputer, the CPU 70 collects and processes information and gives instructions to various control circuits based on its computing function. Hence, the CPU 70 controls the entire mobile telephone 11.

The memory 71 is made up of a semiconductor memory such as a RAM or a ROM; or an information storage device containing a recording medium such as a magnetic disk drive or an optical disc drive. The memory 71 stores various information under the control of the CPU 70. The memory 71 stores programs and data so that they are available for the CPU 70 to implement various kinds of control and computation.

The I/O interface 72 is an interface circuit for data exchange with external device under the control of the CPU 70. The I/O interface 72 is provided with interface circuits and a connect connector to communicate with the cradle 10.

The mobile telephone high frequency circuit 73 is a circuit oscillating at, and controlling, a high frequency for the communications between the mobile telephone 11 and a base station. Typically, the circuit 73 oscillates at a radio wave frequency of 800 MHz (megahertz) or 1.5 GHz (gigahertz). Using the radio wave, the mobile telephone 11 is capable of communications with a base station tens of kilometers away. The mobile telephone high frequency antenna 74 is a metal antenna for use in the oscillation at a radio wave frequency.

The short distance wireless circuit 75 is a circuit for short distance wireless communications with the sensor 12 and the communications circuit 24 in the cradle 10, and operates by means of a weak radio wave over a 2.4-GHz (gigahertz) wireless LAN or Bluetooth whereby the mobile telephone 11 is capable of direct short distance wireless communications with the sensor 12 and the cradle 10. The short distance wireless communications antenna 76 is a metal antenna for use in the oscillation at a radio wave frequency.

The DSP 77 is a digital signal processor and implements various digital signal processes under the control of the CPU 70.

The PCM codec 78 is a circuit performing an encoding process converting a signal from analog to digital and a decoding process converting a signal from digital to analog. The PCM codec 78 converts an audio signal (analog signal) picked up by the microphone 80 to a digital signal for output to the DSP 77 and a digital signal from the DSP 77 to an audio signal for output to the speaker 79.

The speaker 79 is adapted to receive an electrical audio signal input from the PCM codec 78 and produce actual sounds. The user can check the audio output from the mobile telephone 11 through the speaker 79.

The microphone 80 is adapted to pickup the user's voice and sound and produce an electrical audio signal, allowing the user to talk at the microphone 80 to make a voice call through the mobile telephone 11.

The camera section 81 includes a set of optical lenses, a CCD (Charge Coupled Device) camera, and a drive circuit for the camera. The camera section 81 captures an image by focusing light on the CCDs through the set of optical lenses. The camera section 81 has also a function of controlling the zoom ratio in imaging by adjusting the position of each optical lens.

The display section 82 includes a dot matrix LCD (Liquid Crystal Display), but may be manufactured from any device, such as an LED (Light Emitting Diode) display, which is capable of displaying information to the user.

The operation section 83 is a user interface with a keyboard including ten keys and a "+" key. Alternatively, the operation section 83 may be any of a variety of pointing and similar devices.

The mobile telephone 11 of this kind is sold to users at a relatively low price and employed to provide, apart from voice calls, various services including packet-based data calls, music/game downloads, and "e-commerce".

[3. Sensor Structure]

The sensor 12 consists of multiple sensors sensing a state of a monitored area. According to the present embodiment, they are installed various monitoring points both indoors and outdoors. As mentioned previously, the sensors 12 and the cradle 10 can perform short distance wireless communications, and require no complex wiring connecting numerous sensors 12, so that the sensors 12 can be readily installed and managed. Each sensor 12 has its unique ID (identification) number and sends the ID number to the cradle 10 so that the cradle 10 can identify the sensor 12.

One can arbitrarily determine the number and type of the sensors 12 installed in monitored areas, in consideration of the purpose and economics of the security system. Examples include open/close sensors installed at the main entrance and other doors and windows, for the purpose of detecting an intruder to a house; fire sensors detecting a fire through the detection of a smoke and an unusual rise in temperature; various built-in sensors in lights, safes, air conditioners, refrigerators, and the like for the purpose of detecting the presence of a person in the house and an abnormality of various indoor facilities; infrared sensors and CCD cameras attached to a robot watchdog or house animal for the purpose detecting a suspicious person hanging around the house; and any other sensing means.

It is preferred if the sensors 12 may include a control circuit controlling the device to which the sensors 12 are attached, in addition to a simple state-sensing circuit. For example, in the case of a built-in sensor, it is preferably capable of controlling the power on/off of the light and the urgent lock for the safe and temperature settings for the air conditioner and refrigerator. This enables the cradle 10 to control various devices through the sensors 12, in addition to the reception of information from the sensors 12. As a result, a wide range of security and home control services become available.

Since communicating by means of weak radio wave, the sensors 12 have a simple and compact circuit arrangement and may be mounted to a wall, ceiling, or any other place. The sensors 12 are relatively low in power consumption and operate from, for example, a commercially available button-type battery for an extended period of time.

Apart from the short distance wireless communications with the cradle 10, the sensors 12 may include unique communications means: for example, they may be capable of connecting to the Internet or another communications network (external communications network) via a wired telephone link. Example of the sensors 12 include combinations of a personal computer and a short distance wireless communications interface (e.g. wireless LAN/Bluetooth card) and an Internet appliance terminal with an LCD, touch panel sensor, user interface, speaker, microphone, etc. all fitted in a single enclosure. In these cases, the user of the mobile telephone 11 can readily connect to the Internet through the cradle 10 and the sensors 12 and collect various information. This means that the user can connect to the Internet, at or out of home, by operating the mobile telephone 11 alone.

[4. Management Center Structure]

Figure 10:
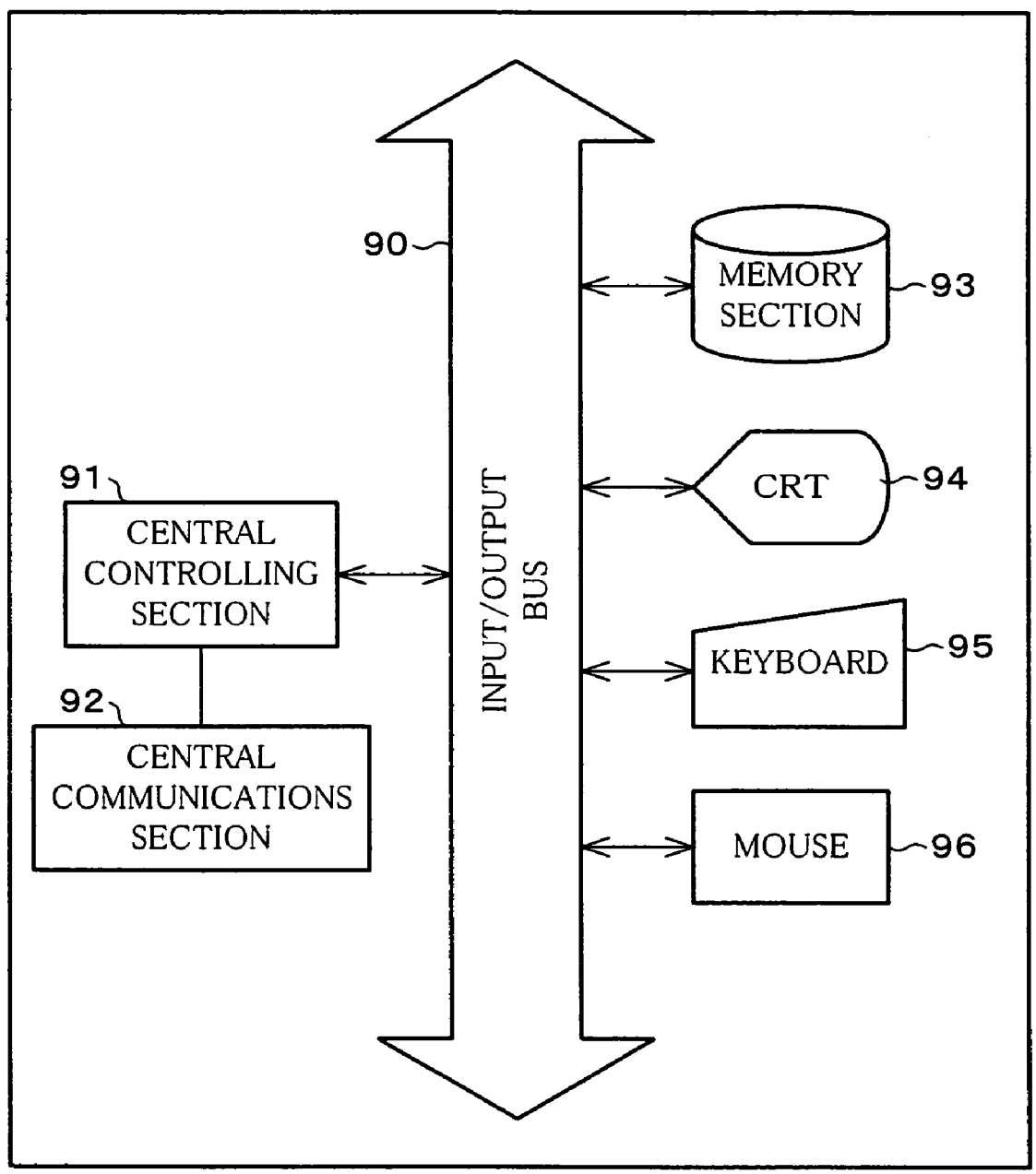
FIG. 10 is a block diagram schematically showing an arrangement of a management center.

FIG. 10 is a block diagram schematically showing an arrangement of a management center 13. As shown in the figure, the management center 13 has an input/output bus 90 as an interface through which a central controlling section (information managing means) 91 and a central communications section (information receiving means) 92 are connected to a memory section 93, CRT (Cathode Ray Tube) 94, keyboard 95, and mouse 96.

Built around, for example, a microcomputer, the central controlling section 91 collects and processes information from home security systems, and also controls the management center 13.

The central communications section 92 is adapted to communicate with the mobile telephone 11 and the cradle 10 under the control of the central controlling section 91, acting as an interface with the outside. The central communications section 92 may communicate directly with the mobile telephone 11, but normally via various telephone base stations.

The memory section 93 includes a semiconductor memory (typically RAM or ROM) and various storage devices (typically magnetic disk drives and optical disc drives), and is adapted to store various information under the control of the central controlling section 91. The memory section 93 not only acts as a data base storing information transmitted from security systems, but also stores programs under which the central controlling section 91 performs various kinds of control and computation.

The CRT 94, keyboard 95, and mouse 96 are a publicly known user interface. They are used for the manager to give various commands to the management center 13 and check/correct the record in the memory section 93. Various information is entered through the user interface and stored in the memory section 93.

[5. Example of Operation when Mobile Telephone is on Cradle]

Now, referring to FIG. 11, the following describe an example of the operation of the security system when the mobile telephone 11 is on the cradle 10: e.g., when the user is at home or when one of mobile telephones 11 owned by the user is on the cradle 10.

Sensors 12*a*–12*e* are installed indoors/outdoors: 12*a* is an open/close sensor sensing a open/closed window 100, 12*b* is an open/close sensor sensing an open/closed main entrance door 101, 12*c* is a fire sensor sensing a smoking and an unusual rise in temperature in a room, 12*d* is a human body sensor sensing a person in a room using, for example, infrared, and 12*e* is a power on/off sensor, incorporated in a light, sensing the power on/off of the light.

Among the sensors, the sensor 12*e* has a special function of controlling the brightness and power on/off of the light. Thus, through the sensor 12*e,* the mobile telephone 11 and the cradle 10 can not only detect the power on/off of the light, but also perform direct control of the light's operation. For example, the user, when at home, can turn on all lights (e.g., those installed at a main entrance and in a hallway and living room) either sequentially or all at once, by entering a command through the operation section 83 of the mobile telephone 11.

Alternatively, the command for the operation of the lights may be entered in advance by the user to the mobile telephone 11 when he/she is still out, and sent to the sensors 12 from the mobile telephone 11 through the cradle 10 when he/she replaces the mobile telephone 11 on the cradle 10 upon coming back home. Examples of appliances controlled by the sensors 12, other than the lights, are air conditioners, refrigerators, safes, and various other devices and machines.

The sensors 12 monitors a monitored area for any abnormalities (e.g., an open/closed door or window, and an indoor smoking) round the clock, and reports results of the monitoring to the cradle 10 regularly or immediately in the even of an abnormality occurrence by short distance wireless communications.

Upon reception of the report from the sensors 12 through the communications circuit 24, the CPU 20 in the cradle 10 transfers the report data to the mobile telephone 11 through the I/O interface 22 and instructs the CPU 70 in the mobile telephone 11 to transmit the report data to the management center 13.

Upon reception of the report data transmitted from the mobile telephone 11, the management center 13 stores the report data in the memory section 93 under the control of the central controlling section 91. The management center. 13 informs the user or a security firm (service provider) of the content of the report data, to report the presence of an intruder.

The cradle 10 according to the present embodiment changes the orientation of the mobile telephone 11, by driving the motor driving section 26 and the motor 27 in accordance with the report content from the sensors 12. Specifically, the cradle 10 is rotated so that the microphone 80 and the camera section 81 in the mobile telephone 11 turn to the sensor 12 which has detected an abnormality, such as intrusion by a suspicious person or a quick rise in temperature.

If an infrared or radar function of the sensor 12 is able to accurately pinpoint where the abnormality has occurred, the sensor 12 preferably sends information (identified position information) on the position of the abnormality occurrence to the cradle 10. When this is the case, the cradle 10 is rotated so that the microphone 80 and the camera section 81 in the mobile telephone 11 turn to the specific position of the abnormality occurrence, not to the sensor 12 which has detected an abnormality. Thus, one can recognize the abnormality in the monitored area by means of the voice/sound detection by the microphone 80 and imaging by the camera section 81.

It is also preferred if the CPU 20 in the cradle 10 can control the image zoom ratio of the camera section 81 by means of control data transmitted through the I/O interface 22. In addition, if the sensor 12 is adapted to connect to the Internet or another external communications network, one can control the rotation of the cradle 10 and the image zoom ratio for the camera section 81 from out of the house.

If the intruder becomes aware of the cradle 10, he/she may possibly attack the cradle 10 to obstruct reporting. As a counter-measure to such an attack on the cradle 10, the CPU 20 in the cradle 10 preferably assumes that it is under attack and reports the situation to the management center 13 when the destruction sensor 29 has detected abnormal vibration or sound.

The cradle 10 cannot send a direct report to the management center 13 in such an event, unless the cradle 10 is connected to the mobile telephone 11. The cradle 10 can however send a report indirectly in the following manner.

The cradle 10 communicates with another cradle located nearby by short distance wireless communications through the communications circuit 24 and the antenna 25, to send the report to that cradle which will pass the report on to the management center 13 through the mobile telephone connected to it.

In this fashion, the user with multiple cradles 10 can consolidate the communications traffic with the management center 13 by collecting information at one of the cradles 10.

[6. Example of Operation when Mobile Telephone is Not on Cradle]

Next, the following will describe an example of the operation of the security system when the mobile telephone 11 is not replaced on the cradle 10: e.g., when the user is out of the house carrying the mobile telephone 11 with him/her.

In such an event, the cradle 10 cannot communicate with the management center 13, but can still communicate with a mobile telephone 11 nearby through a short distance wireless link. When the user is near the cradle 10, for example, right after having left home or right before arriving home, the cradle 10 can communicate with the mobile telephone 11, and the security system can provide the following services.

When out of the house, the user launches application software on the mobile telephone 11 and enters a command to lock/unlock the main entrance door in advance through the operation section 83 while checking the display on the display section 82. Apart from the main entrance door, a command may be entered to lock/unlock a back door, a garage shutter, a combination of them, or whatever the user likes. As to the garage shutter, it is preferred if command are entered in advance not only to lock/unlock the shutter, but also to open/close it. Commands may be entered also to turn on/off lights in the garage.

As the mobile telephone 11 moves into a communicable range of the cradle 10 right before arriving home, the mobile telephone 11 transfers the commands to the cradle 10 which in turn instructs the sensor 12*b*, controlling the lock/unlock of the main entrance door 101, to lock/unlock it. The sensor 12*b* is connected to a key unit including a movable section such as a solenoid. The key unit locks/unlocks according to an instruction from the sensor 12*b*. As a confirmation, the sensor 12*b* preferably senses the lock/unlock state and sends a result of the sensing to the mobile telephone 11 or the management center 13 through the cradle 10.

Thus, the user can visually confirm which door, shutter, etc. has failed to lock/unlock on the display section 82 of the mobile telephone 11.

The cradle 10 is also capable of short distance wireless communications with sensors 12 which can connect to the Internet or a like network or a cradle located nearby, if any. This enables the cradle 10 to inform, for example, the management center 13 of the replacement of the mobile telephone 11 and whether the user is out or at home according to the communications state with the mobile telephone 11.

For example, when the user arrives at home, by means of instructions to the mobile telephone 11 and the sensors 12, the management center 13 can turn on the power supply to the air conditioner or turn on the power supply to Internet appliances to which sensors 12 are attached to present the user the latest news, a TV program schedule, notes from the family, and newly arrived e-mails messages.

It is preferred as previously mentioned if the cradle 10 assumes that it is being attacked and reports the situation to the management center 13 when the destruction sensor 29 in the cradle 10 senses abnormal vibration or sound. If the cradle 10 is not connected to the mobile telephone 11, the cradle 10 cannot make a direct report to the management center 13 through the mobile telephone 11.

However, even in such a situation, if there is a sensor 12 which can connect to the Internet or a like network or a cradle located nearby, the cradle 10 can send the report to the management center 13 by short distance wireless communications with that sensor 12 or cradle.

If there is no means at all to report to the management center 13, the CPU 20 in the cradle 10 preferably stores a content and the time of the abnormality sensed by the destruction sensor 29 in the memory 21, so that it can send the content from the memory 21 to the management center 13 later when the mobile telephone 11 is replaced in the cradle 10.

The cradle 10 can also preferably report an abnormality, if detected at all, to the user by short distance wireless communications with the mobile telephone 11 right before he/she arrives at home. This enables the user to avoid a secondary case, for example, running into an intruder as he/she enters the house.

[7. Example of Application to Welfare Services]

Apart from the aforementioned security services, a wide variety of services can be provided if the central controlling section 91 in the management center 13 analyzes data from the cradle 10 in real time or afterwards, including the following welfare services.

The cradle 10, mobile telephone 11, and sensor 1 are installed in the residence of an old person (user) living alone, to detect and report open/close of the main entrance door, a person/persons in a room, open/close of a refrigerator, and use/non-use of miscellaneous household electrical appliances. The management center 13 can hence know the living conditions of the user by analyzing report data stored in the memory section 93.

For example, it would be determined if the user is leading a healthy life, by checking when the user goes out and returns home, as well as the use of lights and household electrical appliances. A sensor 12 may also be attached to a house animal robot or the like living with the user, to detect the user's reactions when the house animal robot is operated according to instructions from the management center 13 and the cradle 10.

The management center 13 provides the information to the family of the user, a welfare services provider, or a local government. In this service example, it is the management center 13, not the cradle 10, that analyze report data in detail. The cradle 10 is therefore not required to include a microprocessor or the like which analyzes report data in detail. Hence, the user can be monitored using a cradle 10 with a relatively simple arrangement.

[8. Example of Application to Vehicles]

In the description so far, the security system according to the present embodiment was aimed at house monitoring. The cradle 10 and the sensors 12 were supposed to be installed in a typical residential building; the present invention is not however limited to these applications. The cradle and the security system according to the present invention may be applied to monitoring of any given object including factories, warehouses, vehicles, trains, ships, shops, and other various facilities.

The following will describe, as an example, the cradle and the security system according to the present invention being applied to a vehicle.

Commercial onboard terminals, often dubbed as "autocomputers," have been conventionally available which aim to monitor a vehicle via a link over the Internet or a network. These onboard terminals needs each vehicle to be equipped with a communications means to make a connection to the Internet, and therefore has a complex structure and is expensive. The high cost has been a large obstacle to provide the onboard terminal as a standard component of a vehicle.

Incidentally, in a vehicle, the mobile telephone 11 has been typically kept in an independent holder or charger installed for use with the mobile telephone.

According to an application of the cradle and the security system of the present invention to a vehicle, the onboard terminal no longer needs a communications means to make a connection to the Internet. This simplifies the structure of the onboard terminal and reduces its cost. From the user's standpoint, with the cradle and the security system according to the present invention being applied to his/her mobile telephone, he/she no longer needs to take the trouble to make a contract for, and maintain, a separate communications line solely for an onboard Internet link and vehicle monitoring.

Hence, the user can enjoy onboard security services similar to those at home, by simply replacing the mobile telephone 11 on the cradle 10 when he/she boards the vehicle. For example, the cradle 10 can inform the management center 13 that the user has alighted from the vehicle, according to a signal indicating lock/unlock of the door.

As in the foregoing, the cradle according to the present invention includes:

a telephone supporting section for supporting a telephone;

a connecting section for electrically connecting to the telephone;

a sensor communications section for receiving a report from a sensor sensing a state of a monitored area;

a transmission instructing section for providing an instruction signal to the-telephone via the connecting section to cause to externally transmit a content of the report from the sensor; and a communications circuit for wirelessly communicating with the telephone.

In addition, the monitoring method according to the present invention includes the steps of:

receiving, at a sensor communications section provided to a cradle, a report from a sensor sensing a state of a monitored area;

providing an instruction signal to a telephone via a connecting section provided to the cradle for electrically connecting to the telephone, so as to externally transmit a content of the report from the sensor; and meanwhile, performing wireless transmission between the cradle and the telephone by means of a communications circuit provided to the cradle.

According to the arrangement, the connecting section provides electrical connection between the cradle and the telephone. In addition, the cradle receives a report from the sensor sensing a state of the monitored area via the sensor communications section, and the transmission instructing section provides an instruction signal to the telephone via the connecting section to cause the telephone to externally transmit the report content.

Thus, a wide range of functions, including Internet connection and security services, are realized using a cradle, providing a safe deposition for a telephone, which has a simple arrangement with no long distance communications means or user interface included.

In addition, according to the arrangement, the cradle includes a communications circuit for wireless communications with the telephone. Therefore, the cradle can perform wireless communications with a telephone located nearby even when the mobile telephone is not replaced on the cradle.

The cradle according to the present invention may be arranged, in the cradle according to the arrangement, to further include a data retrieval section for retrieving data stored in the telephone via the connecting section.

The monitoring method according to the present invention may be arranged, in the monitoring method according to the arrangement, to further including the step of retrieving data stored in the telephone via the connecting section.

According to the arrangement, the cradle can retrieve various data stored in advance in the telephone via the connecting section. For example, the cradle retrieves command information entered to the telephone when the user is out of the house and data (e.g., voice call history) acquired by the telephone via a communications network such as a base station can make use of the acquired data.

In this manner, the user enters instructions and settings for the cradle to the telephone in advance, for example, when he/she is not at home and considers various telephone history information. Services can be provided which match the user's needs.

The cradle according to the present invention may be arranged, in the cradle according to the arrangement, to further include an imaging section for capturing an image of the monitored area.

The monitoring method according to the present invention may be arranged, in the monitoring method according to the arrangement, so that the state of the monitored area is sensed using an imaging section provided to the cradle for capturing an image of the monitored area.

According to the arrangement, the cradle can capture an image of the monitored area even if the telephone does not include an imaging section. The imaging section of the cradle is not limited to digital cameras or other still imaging means, and may be various video cameras and other moving image capturing means.

This enables imaging of suspicious places and external transmission of imaging data even if the telephone does not include an imaging section.

The cradle according to the present invention may be arranged, in the cradle according to the arrangement, so that the transmission instructing section controls an image zoom ratio for the imaging section.

The monitoring method according to the present invention may be arranged, in the monitoring method according to the arrangement, so that an image zoom ratio for the imaging section is changed to scale up/down the image of the monitored area.

According to the arrangement, the cradle can alter the zoom ratio for the imaging section. This enables the image of a suspicious place to scaled up/down for imaging with greater details.

The cradle according to the present invention may be arranged, in the cradle according to the arrangement, to further include orientation altering means for altering orientation of at least either one of the telephone and the imaging section in accordance with the report content received by the sensor communications section.

The monitoring method according to the present invention may be arranged, in the monitoring method according to the arrangement, to further include the step of altering orientation of at least either one of the telephone and the imaging section in accordance with the report content received by the sensor communications section.

In the arrangement, the orientation of the telephone refers specifically to the orientation of various sensors, such as a microphone and a camera, provided to the telephone. In addition, the orientation altering means may be any given arrangement including various motors and solenoids and other actuators.

According to the arrangement, for example, it becomes possible to identify a suspicious place from the report content received by the sensor communications section, and either to detect sound in the vicinity of the suspicious place with a microphone on the telephone or to capture an image of the vicinity with an imaging section of the telephone or the cradle.

This enables information to be accurately collected on the vicinity of the suspicious place and realizes a sophisticated security function.

The cradle according to the present invention may be arranged, in the cradle according to the arrangement, to further include a destruction sensing section for sensing abnormal vibration or sound thereof as an event possibly leading to destruction.

The monitoring method according to the present invention may be arranged, in the monitoring method according to the arrangement, to further include the step of sensing abnormal vibration or sound of the cradle as an event possibly leading to destruction.

According to the arrangement, the cradle can sense an attack or a destructive act on the cradle from a suspicious person through abnormal vibration or sound.

This enables the cradle to report an assault or a destructive act of a suspicious person to the outside and a situation to be avoided that the security function fails to work.

The cradle according to the present invention may be arranged, in the cradle according to the arrangement, to further include a sensor instructing section for transmitting, to the sensor, control instruction information for a device to which the sensor is attached.

The monitoring method according to the present invention may be arranged, in the monitoring method according to the arrangement, to further include the step of transmitting, to the sensor, control instruction information for a device to which the sensor is attached.

According to the arrangement, the sensor instructing section transmits, to the sensor, control instruction information for a device to which the sensor is attached. The sensor, receiving it, can provide the control instruction information directly to the control section of the device according to the content of the control instruction information. Therefore, the control section of the device can control the device according to the control instruction information from the sensor.

This enables various devices to be controlled according to user commands and sensor reports and provides a sophisticated security function including home controls.

The cradle according to the present invention may be arranged, in the cradle according to the arrangement, so that the sensor communications section wirelessly communicates with the sensor.

The monitoring method according to the present invention may be arranged, in the monitoring method according to the arrangement, so that the sensor communications section wirelessly communicates with the sensor.

According to the arrangement, there is no need to provide a complex line for communications between the sensor and the cradle. Numerous sensors are therefore readily installed. In addition, in the case of multiple cradles, they can wirelessly communicate with each other for exchange of various information and transmission of commands to different cradles.

The cradle according to the present invention may be arranged, in the cradle according to the arrangement, so that the sensor connects to an external communications network.

The monitoring method according to the present invention may be arranged, in the monitoring method according to the arrangement, so that the sensor connects to an external communications network.

According to the arrangement, the sensor connects to an external communications network such as the Internet. Therefore, if the telephone is not replaced on the cradle in an emergency, the cradle can externally send various reports via the sensor. In addition, the cradle and the sensor can collect various information over the external communications network.

The cradle according to the present invention may be arranged, in the cradle according to the arrangement, to further include a detected information storage section for storing a content of sensing by the sensor.

The monitoring method according to the present invention may be arranged, in the monitoring method according to the arrangement, to further include the step of storing the content of sensing by the sensor.

According to the arrangement, the content of sensing by the sensor can be stored if the cradle is not capable of external communication. The cradle can externally report the content of sensing by the sensor when the cradle is capable of external communications sometime later.

The cradle according to the present invention may be arranged, in the cradle according to the arrangement, so that the sensor transmits, to the sensor communications section, identified position information on where an abnormality has occurred in the monitored area.

The monitoring method according to the present invention may be arranged, in the monitoring method according to the arrangement, so that the sensor transmits, to the sensor communications section, identified position information on where an abnormality has occurred in the monitored area.

According to the arrangement, the cradle can identify the position of the abnormality occurrence on the basis of the identified position information. This enables the above situations in the monitored area to be more specifically perceived.

In the cradle and the monitoring method according to the present invention, the telephone is preferably a mobile telephone. The telephone according to the present invention is however not limited to the mobile telephone, and may be, for example, the slave machine of a common cordless telephone set.

In addition, the security system according to the present invention includes:
a cradle according to any one of the arrangements: and
a managing device including: information receiving means for receiving information from the cradle; and information managing means for managing the information received by the information receiving means.

In the arrangement, information from the cradle inclusively refers to all information transmitted according to instructs of the cradle, from no matter which transmission means the information is transmitted, the telephone or the sensor.

According to the arrangement, the information managing means can analyze information from the cradle in real time or afterwards. It therefore becomes possible to provide a wide range of information to the user and third parties.

In addition, the telephone according to the present invention is arranged to include a cradle communications section for receiving the instruction signal from the transmission instructing section in a cradle according to any one of the arrangements.

According to the arrangement, the telephone can receive an instruction signal from the cradle at the cradle communications section and externally transmit the report content from the sensor.

Thus, a wide range of functions, including Internet connection and security services, are realized using a cradle which has a simple arrangement with no long distance communications means or user interface included.

The embodiments and examples described in BEST MODE FOR CARRYING OUT THE INVENTION are for illustrative purposes only and by no means limit the scope of the present invention. Variations are not to be regarded as a departure from the spirit and scope of the invention, and all such modifications as would be obvious to one skilled in the art are intended to be included within the scope of the claims below.

INDUSTRIAL APPLICABILITY

As in the foregoing, the cradle according to the present invention can realize a wide - range of functions, including Internet connection and security services, simply by replacing a telephone such as a mobile telephone, and is especially suited to the provision of security services to regular homes and the use as an onboard terminal.

The invention claimed is:

1. A cradle, comprising:
a telephone supporting section for supporting a telephone;
a connecting section for electrically connecting the cradle to the telephone;
a sensor communications section for receiving a report from a sensor sensing a state of a monitored area;
a short distance communication section for providing short distance wireless communications between the cradle and another cradle; and
a transmission instructing section for providing an instruction signal to the telephone via the connecting section to cause a content of the report from the sensor to be externally transmitted via the telephone.

2. The cradle as defined in claim 1, further comprising: a data retrieval section for retrieving data stored in the telephone via the connecting section.

3. The cradle as defined in claim 1, further comprising an imaging section for capturing an image of the monitored area.

4. The cradle as defined in claim 3, wherein
the transmission instructing section controls an image zoom ratio for the imaging section.

5. The cradle as defined in claim 3, further comprising orientation altering means for altering orientation of at least either one of the telephone and the imaging section in accordance with the content of the report received by the sensor communications section.

6. The cradle as defined in claim 1, further comprising a destruction sensing section for sensing abnormal vibration or sound thereof as an event possibly leading to destruction.

7. The cradle as defined in claim 1, further comprising a sensor instructing section for transmitting, to the sensor, control instruction information for a device to which the sensor is attached.

8. The cradle as defined in claim 1, wherein
the sensor communications section wirelessly communicates with the sensor.

9. The cradle as defined in claim 1, wherein
the sensor connects to an external communications network.

10. The cradle as defined in claim 1, further comprising a detected information storage section for storing a content of sensing by the sensor.

11. The cradle as defined in claim 1, wherein
the sensor transmits, to the sensor communications section, identified position information on where an abnormality has occurred in the monitored area.

12. The cradle as defined in claim 1, wherein
the telephone is a mobile telephone.

13. The cradle as defined in claim 1, wherein the cradle sends the content of the report from the sensor to the other cradle via the short distance communications section.

14. The cradle as defined in claim 1, wherein the cradle sends the content of the report from the sensor to the other cradle when the telephone is not detected as being connected to the cradle.

15. The cradle as defined in claim 1, wherein the cradle receives the content of a report from a sensor from the other cradle via the short distance communications section, and provides an instruction signal to the telephone to cause the received content to be externally transmitted via the telephone.

16. A security system, comprising:
a cradle including:
 a telephone supporting section for supporting a telephone;
 a connecting section for electrically connecting the cradle to the telephone;
 a sensor communications section for receiving a report from a sensor sensing a state of a monitored area;
 a short distance communication section for providing short distance wireless communications between the cradle and another cradle; and
 a transmission instruction section for providing an instruction signal to the telephone via the connection section to cause a content of the report from the sensor to be externally transmitted via the telephone; and
a managing device including:
 information receiving means for receiving information from the cradle; and
 information managing means for managing the information received by the information receiving means.

17. A monitoring method, comprising:
receiving, at a sensor communications section provided to a cradle, a report from a sensor sensing a state of a monitored area; and
externally transmitting a content of the report from the sensor, wherein
the content of the report is provided to a telephone via a connecting section of the cradle if the telephone is supported in the cradle, and the content of the report is provided to another cradle via short distance wireless communication if no telephone is supported in the cradle.

18. The monitoring method as defined in claim 17, further comprising the step of retrieving data stored in the telephone via the connecting section.

19. The monitoring method as defined in claim 17, wherein
the state of the monitored area is sensed using an imaging section provided to the cradle for capturing an image of the monitored area.

20. The monitoring method as defined in claim 19, wherein
an image zoom ratio for the imaging section is changed to scale up/down the image of the monitored area.

21. The monitoring method as defined in claim 17, further comprising the step of altering orientation of at least either one of the telephone and the imaging section in accordance with the content of the report received by the sensor communications section.

22. The monitoring method as defined in claim 17, further comprising the step of sensing abnormal vibration or sound of the cradle as an event possibly leading to destruction.

23. The monitoring method as defined in claim 17, further comprising the step of transmitting, to the sensor, control instruction information for a device to which the sensor is attached.

24. The monitoring method as defined in claim 17, wherein
the sensor communications section wirelessly communicates with the sensor.

25. The monitoring method as defined in claim 17, wherein
the sensor connects to an external communications network.

26. The monitoring method as defined in claim 17, further comprising the step of storing a content of sensing by the sensor.

27. The monitoring method as defined in claim 17, wherein
the sensor transmits, to the sensor communications section, identified position information on where an abnormality has occurred in the monitored area.

28. The monitoring method as defined in claim 17, wherein
the telephone is a mobile telephone.

* * * * *